W. HENRY AND I. BASSFORD.
BOTTLE BLOWING MACHINE.
APPLICATION FILED OCT. 27, 1919.
1,437,178.
Patented Nov. 28, 1922.
7 SHEETS—SHEET 1.
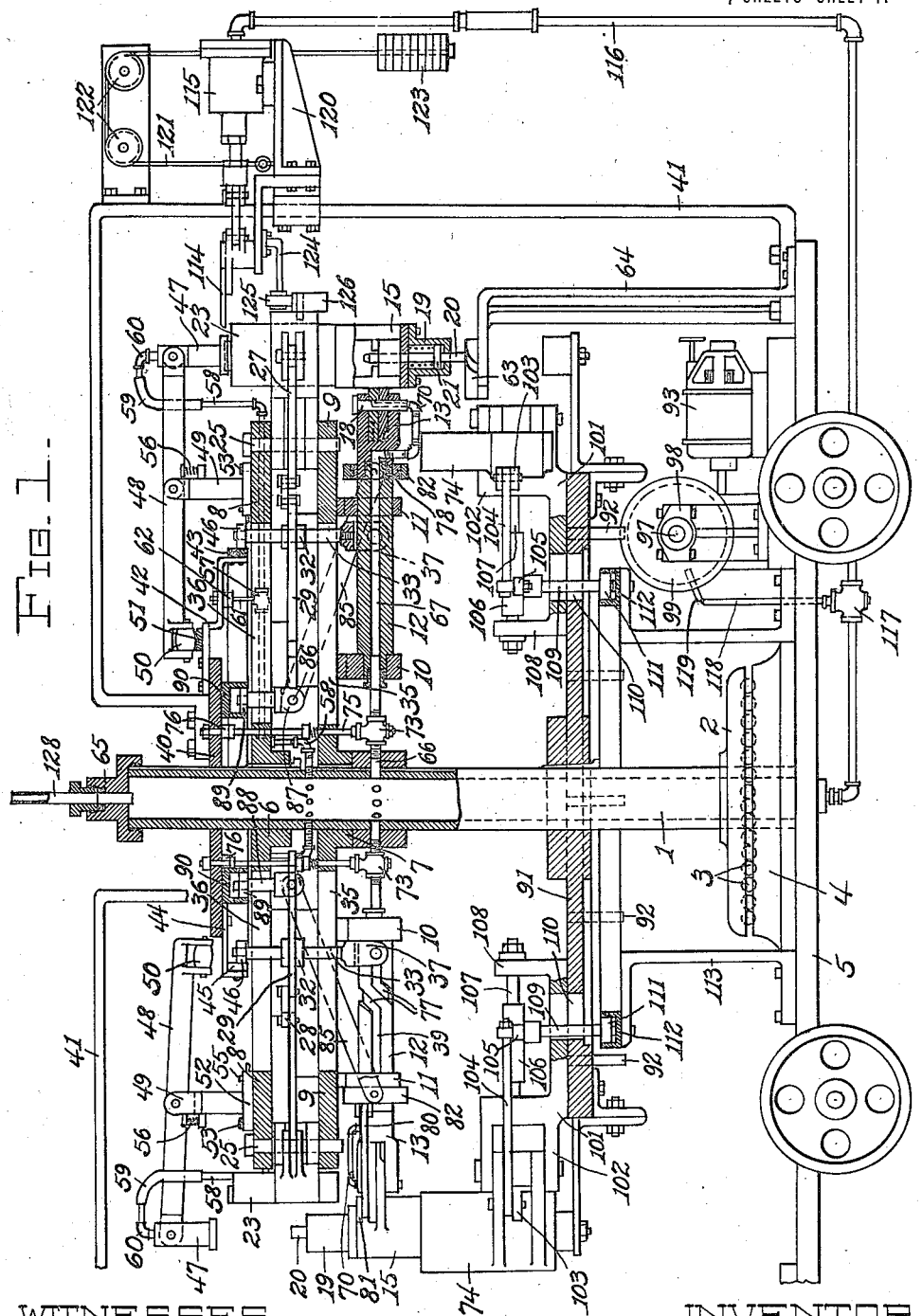
WITNESSES.
L. B. Wood
A. L. Dunlap
INVENTOR
William Henry
Isaac Bassford.
BY N. E. Dunlap
ATTORNEY

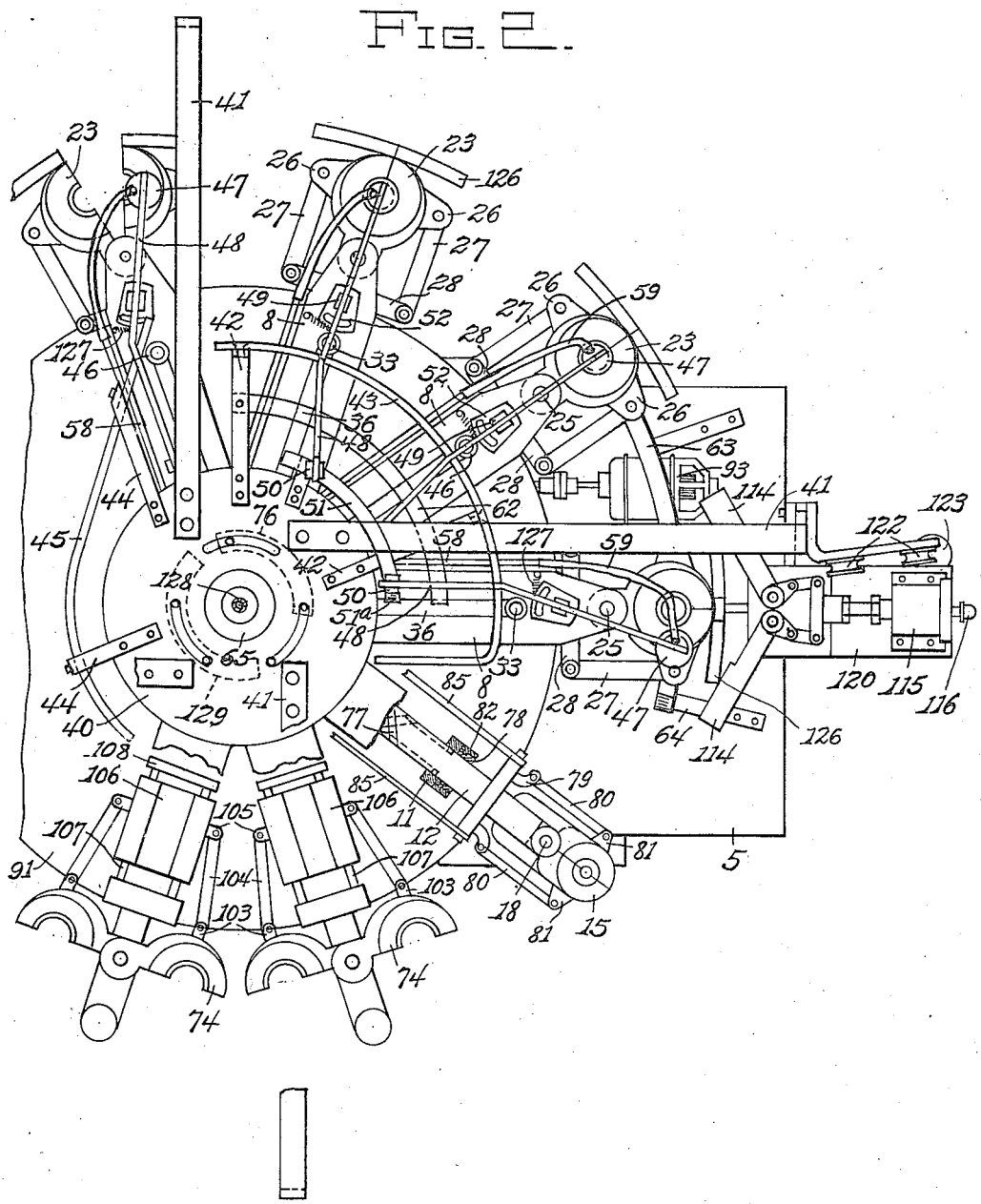

W. HENRY AND I. BASSFORD.
BOTTLE BLOWING MACHINE.
APPLICATION FILED OCT. 27, 1919.
1,437,178.
Patented Nov. 28, 1922.
7 SHEETS—SHEET 3.
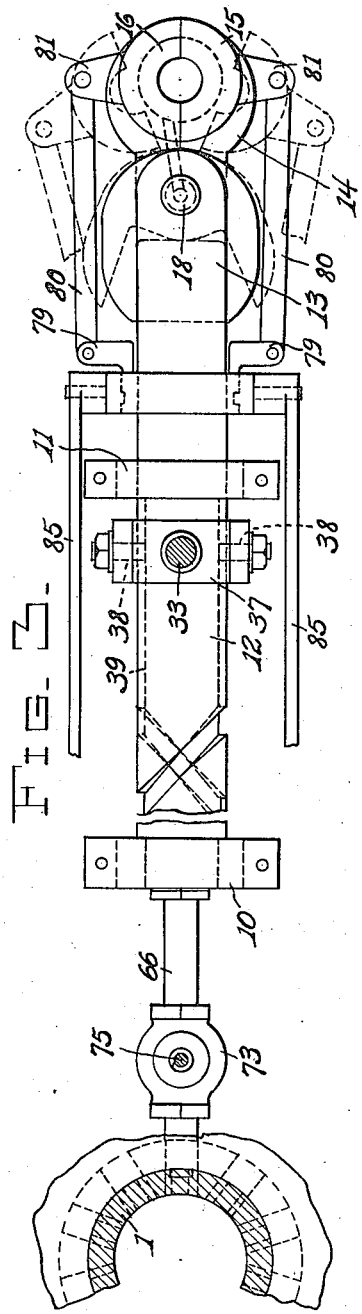
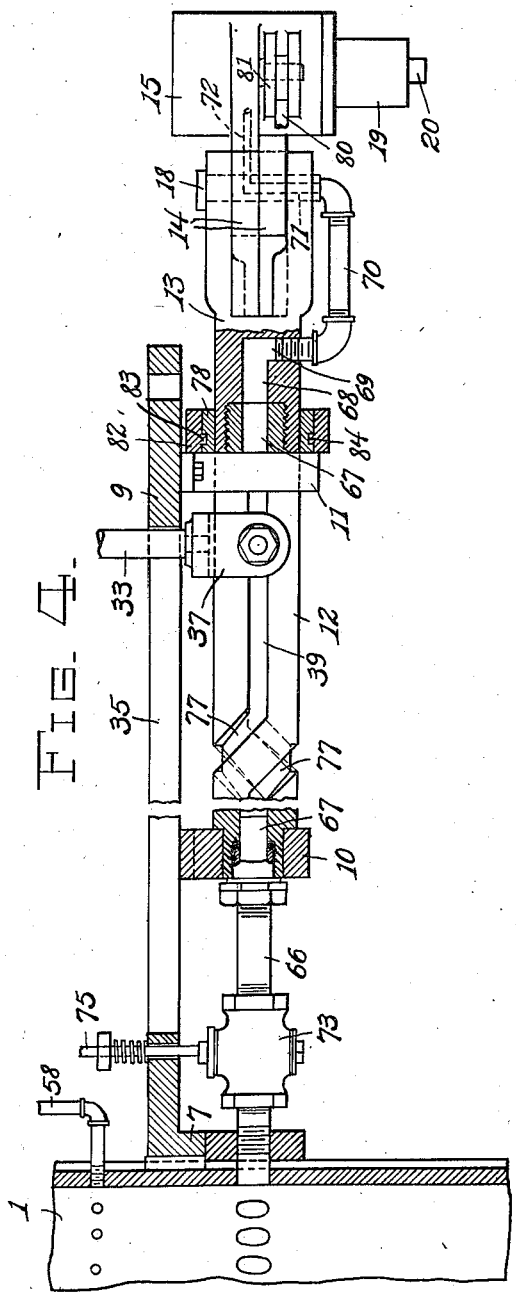

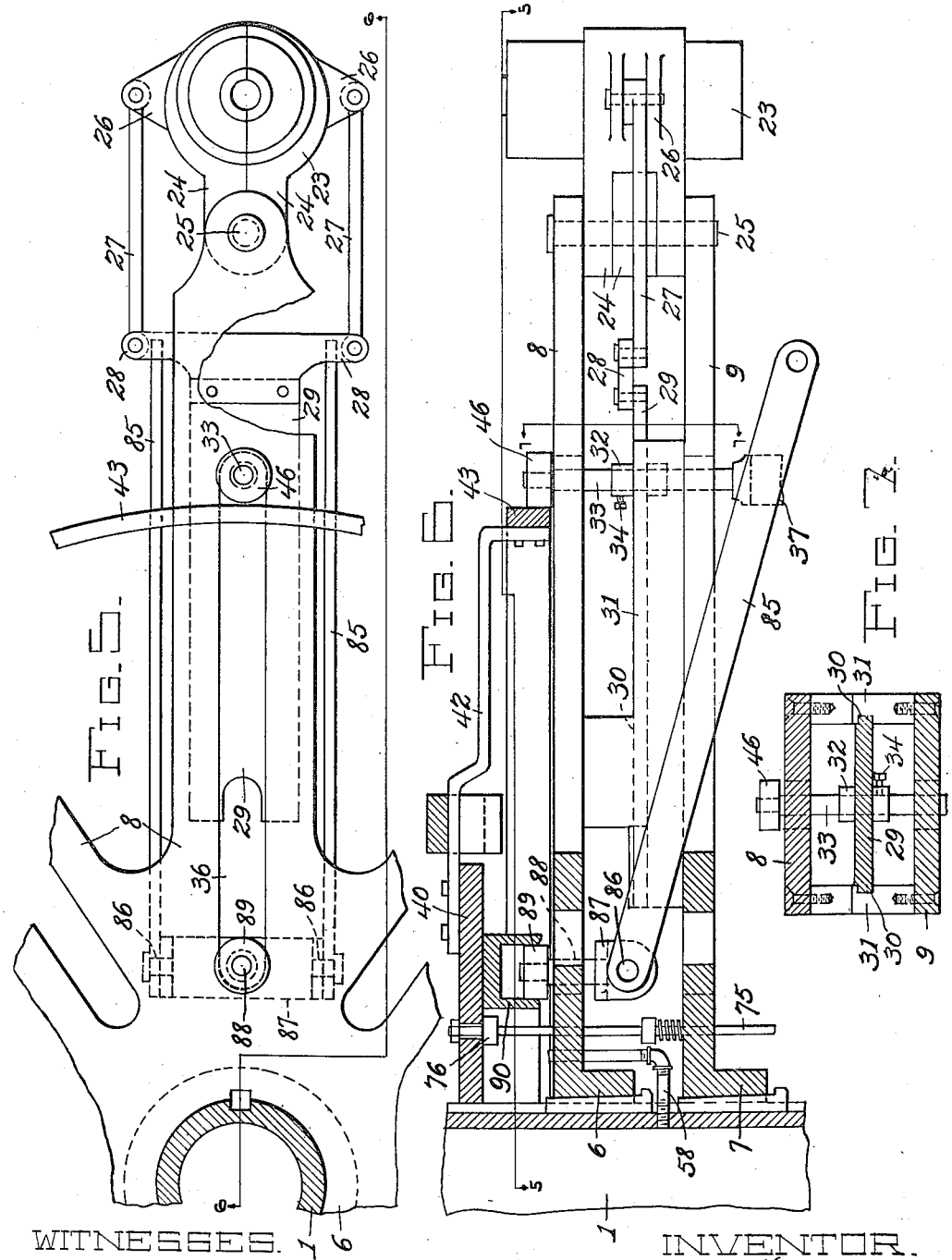

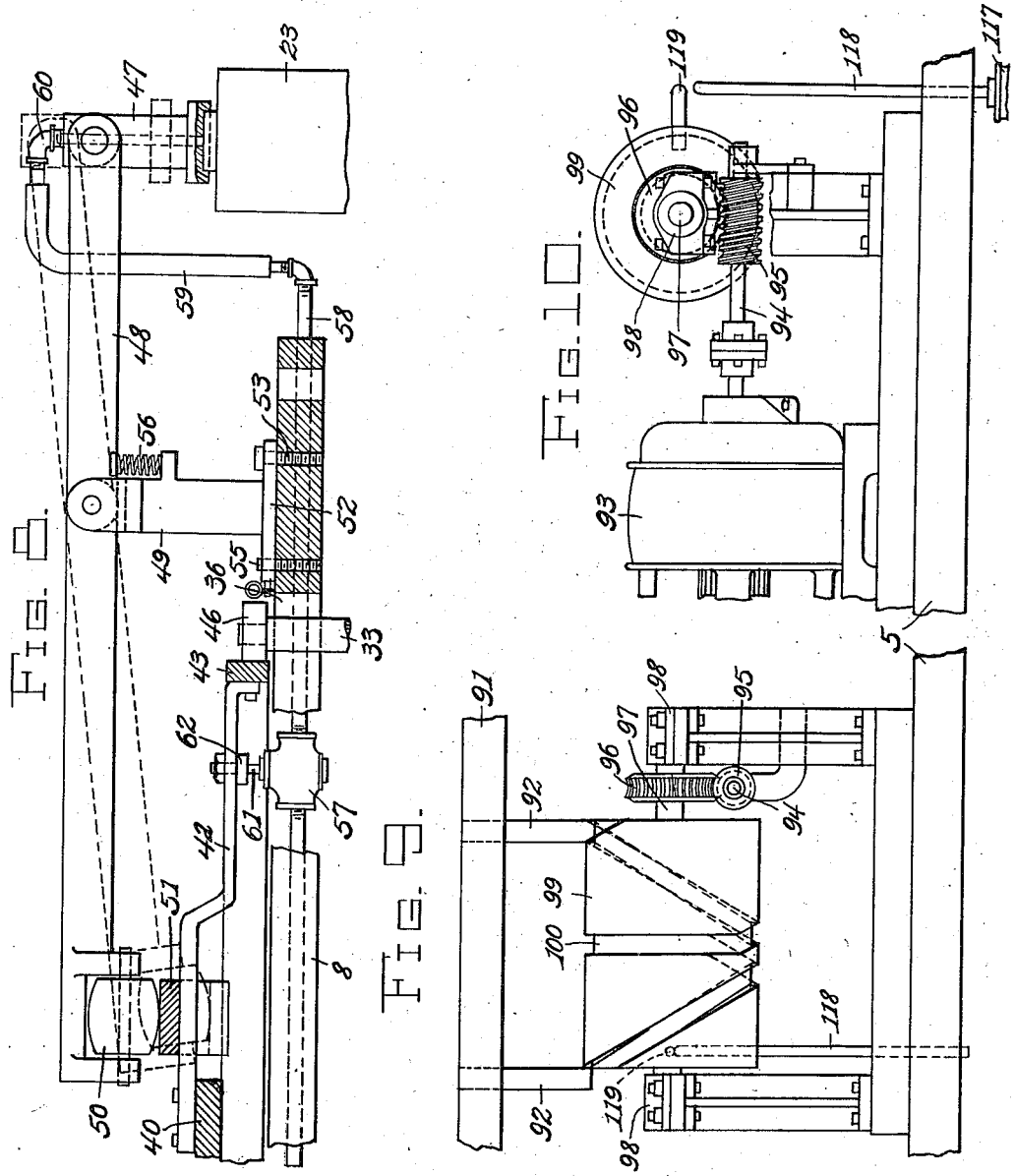

W. HENRY AND I. BASSFORD.
BOTTLE BLOWING MACHINE.
APPLICATION FILED OCT. 27, 1919.
1,437,178.
Patented Nov. 28, 1922.
7 SHEETS—SHEET 6.
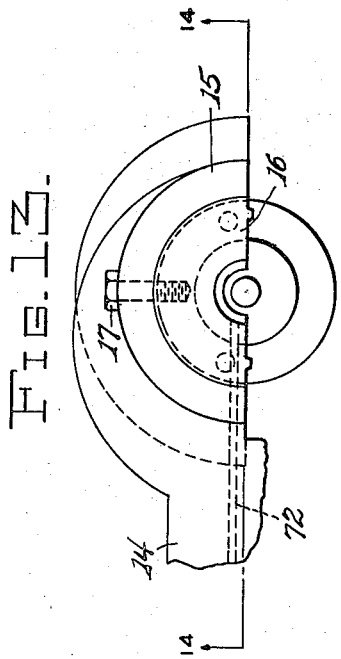
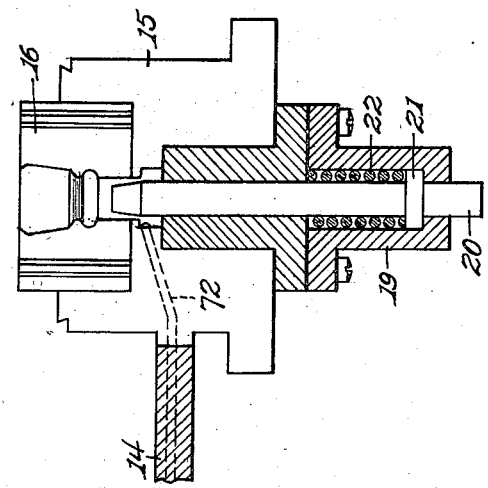
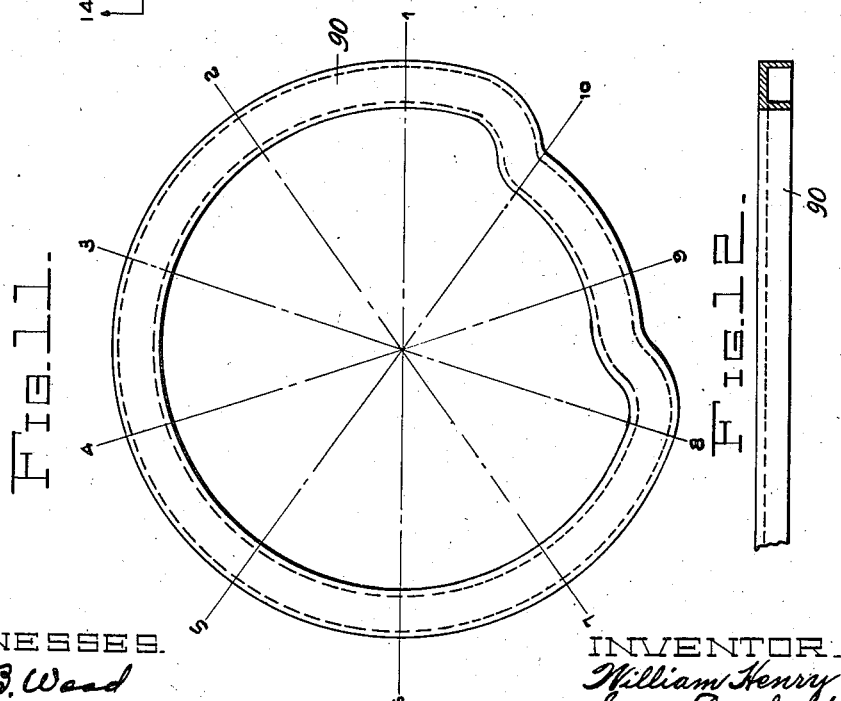

W. HENRY AND I. BASSFORD.
BOTTLE BLOWING MACHINE.
APPLICATION FILED OCT. 27, 1919.
1,437,178.
Patented Nov. 28, 1922.
7 SHEETS—SHEET 7.
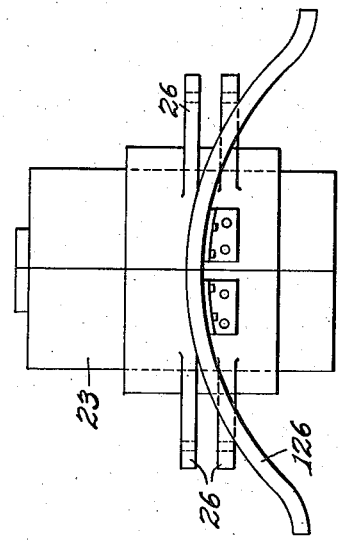
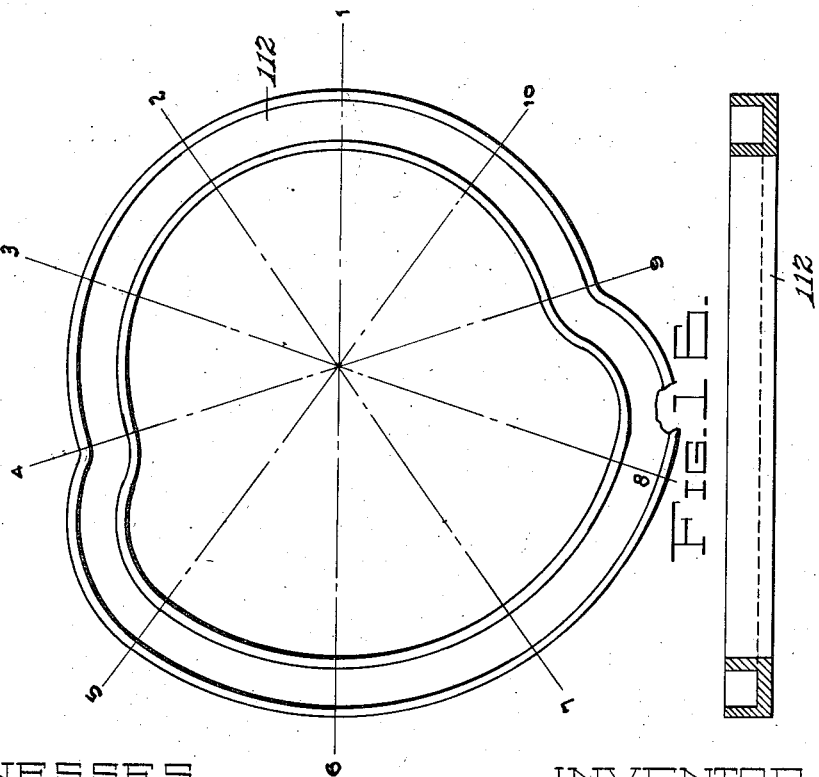
WITNESSES.
L. B. Wood
A. L. Dunlap
INVENTOR.
William Henry.
Isaac Bassford.
BY N. E. Dunlap
ATTORNEY.

Patented Nov. 28, 1922.

1,437,178

UNITED STATES PATENT OFFICE.

WILLIAM HENRY AND ISAAC BASSFORD, OF WELLSBURG, WEST VIRGINIA; SAID ISAAC BASSFORD ASSIGNOR OF ONE-SIXTH TO GEORGE W. BASSFORD, OF WELLSBURG, WEST VIRGINIA, AND SAID HENRY ASSIGNOR OF ONE-THIRD TO EMMA HALL AND ONE-TWELFTH TO J. C. PERRIN, BOTH OF WELLSBURG, WEST VIRGINIA.

BOTTLE-BLOWING MACHINE.

Application filed October 27, 1919. Serial No. 333,480.

*To all whom it may concern:*

Be it known that we, WILLIAM HENRY and ISAAC BASSFORD, citizens of the United States of America, and residents of Wellsburg, county of Brooke, and State of West Virginia, have invented certain new and useful Improvements in Bottle-Blowing Machines, of which the following is a specification.

This invention relates broadly to bottle blowing machines, and more particularly to an apparatus whereby each and every of the various operations involved in the manufacture of blown glass bottles are automatically performed.

The primary object of the invention is to provide an apparatus or machine by means of which the complete formation of blown glass bottles from the introduction of the charge of molten glass in the blank-forming mold is automaticlly accomplished.

With this and other important objects in view, the invention resides in the features of construction, arrangement of parts and combinations of elements which will hereinafter be exemplified, reference being had to the accompanying drawings, in which—

Figure 1 is a central vertical section of a machine constructed in accordance with our invention;

Figure 2 is a partial top plan view of the same, portions of the structure being shown broken away to illustrate various structural features;

Figure 3 is an enlarged top plan view of a neck-mold with the supporting shaft therefor and parts of the mold actuating mechanism;

Figure 4 is a view of the same partly in longitudinal section and partly in side elevation;

Figure 5 is a sectional elevation taken in substantially the plane indicated by the line 5—5, Fig. 6, showing in top plan a blank-mold and parts of the actuating mechanism therefor;

Figure 6 is a sectional elevation taken on the line 6—6, Fig. 5;

Figure 7 is a transverse section on line 7—7, Fig. 6;

Figure 8 is a sectional elevation illustrating a blow-down and the actuating mechanism therefor;

Figure 9 is a side elevation of a part of the intermittent drive;

Figure 10 is an end elevation of the same;

Figure 11 is a top plan view of the guideway associated with the neck-mold operating mechanism;

Figure 12 is a partial section of the same;

Figure 13 is a detail view in top plan of one of the sections of the neck-mold;

Figure 14 is a sectional elevation of the same, the section being taken on line 14—14, Fig. 13;

Figure 15 is a top plan view of the guideway associated with the blow-mold operating mechanism;

Figure 16 is a section of the same.

Figure 17 is a front elevation of a blank-mold.

Referring to said drawings, in which like designating characters distinguish like parts throughout the several views—

1 indicates an upright hollow standard or column having a base 2 mounted to rotate upon ball bearings 3 carried by a support 4 which is preferably mounted upon a wheeled truck 5. Mounted upon said column 1 to rotate with the latter are two similar spiders consisting of hubs 6 and 7 and a plurality of horizontal radials arms 8 and 9, respectively, said spiders being relatively spaced and having the arms 8 and 9 thereof disposed in vertically alined pairs.

Each of the arms 9 of the lower spider carries on its under side a pair of bearing blocks 10 and 11, and journaled for rotary movement in each of said pairs of blocks is a horizontal radially disposed shaft 12 having a head 13 detachably mounted on its outer end. Said head 13 is bifurcated and has mounted in the bifurcation thereof in superposed relation the horizontal hinge-like supporting members 14 of a two-part sectional cup 15 which has detachably mounted therein a sectional ring 16. Said cup constitutes a holder adapted for the reception of interchangeable rings 16, each having an internal contour designed to give form to a bottle neck of a particular shape and size. Said rings are made of two complemental sections which are suitably secured in place on said cup sections, as by set screws 17. A pivot-pin 18 directed vertically through the members of the head 13 and through the interposed members 14 of the cup serves to secure the latter as upon a hinge, as shown in Figs. 1, 3 and 4.

Formed on or attached to the under side of one of the sections of the cup 15 in a position wherein it is axially alined with the cup when the sections of the latter are closed is a small boss-like casing 19 having vertically alined central openings therein. Extending vertically through said casing and having its opposite ends projected through said openings is a vertically movable plunger 20 which has a suitably located fixed collar 21. A compression spring 22 has one end seated upon said collar 21 and its opposite, or upper, end resting against the top of said casing 19. Said spring normally holds said plunger depressed in a position in which the upper end of the latter is withdrawn from the neck-shaping interior of the ring 16, as shown in Fig. 14.

The cup 15, ring 16 and plunger casing 19 together constitute a neck-shaping mold for bottles and will, therefore, be referred to hereinafter as a "neck-mold". The plunger is designed for operation to form a bottle-mouth opening in the neck portion of a charge of molten glass when the latter is compacted in a manner hereinafter explained, which opening is thereafter employed for receiving air under pressure whereby said charge is compacted in an upward direction within a superposed blank-forming mold 23, as will presently be described.

Said blank-mold 23 is of a two-part hinged type, having hinge members 24 disposed between the ends of the companion arms 8 and 9 of the two spiders and connected by a pivot-pin 25, as is best shown in Figs. 5 and 6. Connected pivotally to laterally extending lugs 26 carried by each of the sections of the blank-mold 23 are the outer ends of bars 27 which have their inner ends in like manner connected to opposite laterally extending arms 28 carried by the outer end of a horizontal plate-like slide 29 which has its lateral edges slidably received in longitudinal guide-grooves or channels 30 provided therefor in opposite laterally disposed guide members 31 which are rigidly attached at their upper and lower edges to the opposing faces of the companion spider arms 8 and 9, respectively.

The slide 29 carries at a suitable point a vertically disposed hub-like sleeve 32 through which extends a vertical shaft or rod 33, said sleeve and said shaft being rigidly attached, as by a set screw 34 directed through the former into impinging relation to the latter. Said shaft has its lower end extending through a longitudinal slot 35 provided therefor in the spider arm 9 and has its upper end extending through a similar slot 36 provided in the overlying spider arm 8, and it carries upon its lower end a yoke 37 disposed in straddling relation to the adjacent rotary shaft 12, as is most clearly shown in Figs. 3 and 4. Said yoke, which has opposite inwardly directed lugs 38 with their ends slidably received in grooves or channels 39 provided in opposite sides of the shaft 12, is designed through movement of said shaft or rod 33 along said slots 35 and 36 to effect rotation of said shaft 12 in a manner and for a purpose which will hereinafter be made apparent.

Stationarily located in encircling relation to the column 1 at a suitably spaced distance above the upper spider is a circular table 40 which is supported by a suitable frame, as by angular supports 41 carried by the truck 5 and located outside the range of movement of the rotatable portion of the machine. Mounted on said table at one side of the latter is a plurality of outwardly directed arms 42 which rigidly support on their outer ends a horizontal guide 43 of which the main body portion describes an arc of approximately ninety degrees and is positioned concentric with respect to the column 1. Mounted upon another side of said table 40 are outwardly extending arms 44 of varying lengths which carry upon their outer ends a second guide 45 located in the same horizontal plane with said guide 43.

Carried upon the upper end of each of the vertical rods or shafts 33 is an anti-friction roller 46 which, during a part of each revolution of the machine, travels against the outer face of the arcuate portion of the guide 43, which latter serves throughout said part of the revolution to maintain said rod 33 stationary in its outermost position, in which position the blank-mold 23 is held closed, as shown in Figs. 5 and 6. The rotary travel of the machine is in counter-clockwise direction; hence, promptly following the passage of the anti-friction roller 46 from engagement with the outer face of the guide 43 it engages the inner face of the adjacent end of the guide 45, which end is approximately straight and is disposed tangential with respect to an arcuate forward portion of said guide, as is shown in Fig. 2. Continued rotation of the machine following initial engagement of said roller with said guide 45 results in the vertical rod 33 being rapidly forced inward along the slots 35 and 36 toward the column 1. This movement of said rod effects, through the intermediate mechanism described, the gradual, but rapid, opening of the blank-mold 23 which, as aforesaid, was previously maintained closed by the engagement of the roller 46 with the guide 43. Said mold is in fully open position when the arcuately curved portion of the guide 45 is reached by said roller and is maintained open by said guide during engagement of said roller therewith.

Located over the blank-mold 23 is a vertically disposed member 47, hereinafter termed a "blow-down", through which air is directed for compressing, or compacting, the charge of glass introduced in said blank-mold and for forming the finish of the bottle, said blow-down being adapted to seat closely upon the top of said mold when the latter is closed upon said charge, as is best shown in Fig. 8. Said blow-down is mounted upon the outer end of a lever 48 which is pivotally mounted intermediate its ends upon a support 49 carried at a suitable point upon the underlying arm 8 of the upper spider. The opposite, or inner, end of said lever carries a roller 50 which, throughout an initial portion of each revolution of the machine, travels upon a curved trackway 51 carried by suitable supports, as the arms 42.

The lever 48 normally, or throughout the major portion of each revolution, occupies a laterally swung position in which the blow-down 47 is supported out of overlying relation to the blank-mold 23, as shown at the extreme right in Fig. 2, so that it will not interfere with the charging of said mold. However, immediately following the movement of such mold from its charging station, located at the extreme right in Figs. 1 and 2, the roller 50 engages a sharply inclined front end portion 51ª of said trackway 51, by which its movement is interrupted with the result that the lever 48 is swung around on its support 49 to a position in which it disposes the blow-down 47 directly over, or in axial alinement with, the blank-mold 23. Swinging movement of said lever is stopped at this point and the roller 50 is therefore actuated to mount the trackway 51 over the inclined end portion 51ª of the latter. This results in said lever being rocked forward on its pivotal mounting to a point in which the blow-down is firmly seated upon the top of the blank-mold, as shown at the second and third stations in Fig. 2 and as shown in full lines in Fig. 8.

To provide for the lateral swinging movement of the lever 48 in the manner above described, a special mounting for the support 49 is employed. Said support is rigidly carried by a plate-like base member 52 which is attached to the underlying supporting arm 8 by means of a pivot-pin 53 directed through the outer end thereof. A curved slot 54 provided in the inner end of said base member has received therein an upright pin or stud 55 carried by the arm 8. Said stud and said slot are so arranged relatively that the former engages an end of the latter for preventing swinging movement in one direction beyond the point in which the blow-down is accurately positioned over the blank-mold. When the roller 50 passes off the end of the trackway 51, a compression spring, as 56, located in a suitable position actuates the lever to rock back, elevating the blow-down from operative relation to the blank-mold. Obviously, the trackway 51 must be made of such length as will serve to maintain said operative relation between the blow-down and the blank-mold only throughout the interval required.

Promptly following the seating of the blow-down upon the blank-mold, as described a valve 57 located in an air-conducting line leading from the interior of the column 1 to said blow-down is actuated to open to admit air under pressure to the interior of the blank-mold for compacting in a downward direction the charge of glass previously introduced in the latter. Said air-conducting line comprises a pipe 58 which communicates at a suitable point with the interior of the column 1 and which is preferably arranged to lie adjacent to a lateral edge of the spider arm 8. Attached to the outer end of said pipe 58 is a short length of flexible tubing 59 leading to a nipple 60 carried by the upper end of the blow-down. The valve 57 is preferably of a common pop-valve type, having a vertical stem 61 adapted to engage at the proper moment, and to be depressed to valve-opening position by, the cam-like end of a downwardly-facing horizontal bar 62 which is stationarily carried in an appropriate position, as by the arms 42.

Preceding the compacting of the glass in the blank-mold and in the underlying neck-mold the lower projecting end of the plunger 20 engages and rides up an incline to an elevated position on a curved track 63 provided therefor upon suitably located supports, as 64, said plunger being thrust upward against the tension of its spring 22. So elevated, the upper end of said plunger forms the mouth-opening of the bottle when the glass charge is compacted downward, as aforesaid, which opening is thereafter utilized for the admission of air under pressure whereby the charge of glass is compacted in an upward direction against the superposed seated blow-down for completing the formation of the bottle blank.

Air for compacting the glass, as aforesaid, and for subsequently blowing the bottle is first conducted to the interior of the hollow column 1 through a pipe 128 which leads vertically through a cap 65 carried upon the upper end of said column, a gland and suitable packing being provided so that rotation of said column with respect to said pipe is permitted without leakage. For conducting air from the column to the neck-mold a pipe 66 leads radially outward from said column to the inner end of the rotary shaft 12, there communicating with the end of a longitudinal bore 67 provided in said shaft, which latter has its said end arranged for rotation with respect to said pipe. Said bore 67 communicates at the outer end of said shaft with an alined short bore 68 provided in the adjacent end of the head 13. Leading outward from the outer end of said bore 68 is a port 69 within which is threaded an end of an air-conducting pipe 70 which has its opposite end connected to the lower end of the pivot-pin 18. A bore 71 leads vertically from said lower end of said pivot-pin, and a suitably located side-opening port provided in said pin is adapted to register with the adjacent end of a passage 72 which extends through the hinge-like supporting member 14 of one of the sections of the cup 15 and opens at its outer end into the interior of said cup through that portion of the latter which directly underlies the ring 16 and which loosely embraces the upper end of the plunger 20 when the latter occupies its normal position.

A valve 73 is mounted on the pipe 66 and has a vertically depressible stem 75 adapted at the proper moment to mount and travel upon an arc-shaped horizontal bar 76 whereby it is depressed to valve-opening position, said bar being stationarily mounted in an appropriate position, as on the under side of the table 40, and having a suitable length.

Following the formation of the bottle blank in the blank and neck molds, as described, the blank-mold is opened in the manner hereinbefore described, leaving the blank supported in an upright or upstanding position supported by the neck-mold; and following a partial opening of said blank-mold, rotary movement is imparted to the neck-mold for reversing the blank and disposing the latter in a position where it will be promptly embraced by the then closing sections of a two-part blow-mold 74 which will hereinafter be described in connection with the mechanism by which its opening and closing is effected at proper intervals.

The partial rotary movement of the neck-mold by which reversal of the blank is effected, as aforesaid, results from the travel of the lugs 38 of the yoke 37 from the straight longitudinal channels 39 of the shaft 12 to and along spirally directed grooves 77 which lead at a sharply inclined angle from the inner ends of said channels 39 adjacent to the inner end of said shaft, as is most clearly shown in Figs. 3 and 4. In practice, during the opening of the blank-mold, effected as aforesaid through inward movement of the vertical rod 33 along the slots 36 and 35, respectively, of the spider arms 8 and 9, the lugs 38 travel inward along said channels 39. Just prior to the completion of the blank-mold-opening movement said lugs engage the adjacent ends of the spiral grooves 77 and, in continued inward travel along the latter, act to produce the partial rotation of the shaft 12 required to effect the complete reversal of the neck-mold with the glass blank mounted in the latter.

Loosely embracing the shaft 12 adjacent to and in front of the outer bearing block 11, or embracing an adjacent portion of the head 13, is a longitudinally slidable collar 78 having laterally disposed lugs 79 to which are pivotally attached the inner ends of bars 80 having their opposite, or front, ends in like manner attached to lugs 81 formed on the lateral faces of the two sections of the two-part cup 15, as shown in Fig. 3, so that said sections may be relatively closed and opened, respectively, by outward and inward sliding movement of said collar 78 on said shaft 12. Loosely embracing the periphery of said collar is a band 82 which has an internal rib 83 disposed in an annular groove 84 provided in said collar. Pivotally attached to trunnions formed on opposite sides of said band are the outer ends of two inclined links 85 which extend inwardly and upwardly from said trunnions and on opposite sides of the adjacent spider arm 9 and have their opposite ends pivoted upon trunnions 86 formed on a cross-head 87 carried by the lower end of a short rod 88 which extends vertically through and is movable along the inner end portion of the slot 36 of the adjacent spider arm 8. Mounted upon the upper end of said rod 88 is an anti-friction roller 89 which has a diameter exceeding the width of said slot 36 and which rests upon said arm 8 at opposite sides of said slot for supporting said rod. Said roller 89 is disposed for travel in a guideway formed between the vertically disposed sides of a channel member 90 which is rigidly mounted on the under side of the table 40. Said channel member encircles the column 1 and has an irregular form, as shown in Fig. 11, so that each rod 88 is advanced outward along the slot 36 prior to the arrival of the arm 8 by which it is supported at the blank-mold charging position indicated in Fig. 11 by broken radial line designated 1, thus effecting the closing of the neck-mold through the intermediate mechanism hereinbefore described, and also so that following the completion of the blowing operation by which the bottle is blown, as will hereinafter be described, said rod or shaft will thereby be actuated to move inwardly for effecting the opening of said neck-mold to release the neck of the bottle, such opening and release preferably occurring just prior to the arrival of the mold at the ninth station, as shown in Fig. 11.

Rigidly mounted upon the column 1 at a spaced distance below the mechanisms hereinbefore described is a circular table 91 which carries on its under side adjacent to its peripheral edge at regularly spaced intervals a plurality of vertical spike-like members 92 which constitute, in effect, crown-gear teeth which are successively engaged by a motor-driven device whereby intermittent rotary movement is imparted to said table and, through the latter, to the column 1 and the mechanisms carried thereby.

Referring particularly to Figs. 1, 9 and 10, the numeral 93 indicates an electric motor mounted upon the truck 5 and having its shaft coupled to a shaft 94 which carries a worm 95 with which meshes a worm gear 96 carried by a shaft 97 which is journaled in suitable bearings 98. Fixed upon said shaft 97 is a cylinder or drum 99 having formed in its peripheral surface a continuous deep groove or channel 100 designed to successively receive therein the ends of the crown-gear teeth 92 carried by the table 91 and, through rotation of said drum, to advance said teeth for producing rotation of said table. Said channel 100 is made of such form that the movement imparted to the table is of an intermittent, or a measured step by step, character, it being obviously essential that the various blank-molds shall, in succession, stop and remain stationary at the charging point or station during a sufficient interval of time to allow charging thereof and the shearing from the punty or other charging tool the glass charges introduced in said molds. As is clearly shown in Fig. 9, the drum 99 has that portion of the channel 100 which occupies a midway position on its surface extending annularly, or at a right angle to its axis, so that during the interval in which each tooth 92 travels in said portion the table 91, column 1 and the mechanisms carried by the latter remain stationary. Said annular portion of the channel, as herein shown, has a length approximating the circumference of the drum, but may obviously be variously shortened in length to suit any shorter interval of rest required, or, if necessary to increase the rest interval, a drum of relatively larger diameter may be employed. From the opposite ends of said annular portion said channel 100 extends spirally at suitable angles to the opposite ends of the drum. In practice, when in the rotation of said drum a tooth 92 passes from the annular portion of the channel 100 to the spiral exit portion of the latter, the table 91 immediately starts to rotate and continues such rotation at a uniform speed until the next succeeding tooth passes from the spiral entrance portion of the channel to said annular portion, whereupon rotation immediately ceases. Manifestly, the teeth 92 should be spaced relatively so that just prior to one thereof leaving the axis portion of the channel the next succeeding tooth enters the entrance portion, as shown in Fig. 9.

Carried by the table 91 at properly spaced distances is a plurality of brackets 101 each of which provides a support 102 upon which are suitably hinged the sections of a two-part blow-mold 74. The said sections of the blow-mold carry lugs 103 on the sides thereof, to which are pivotally attached the front ends of bars 104 which are pivoted at their opposite ends to laterally disposed lugs 105 carried by a slide 106 which is slidably mounted upon parallel horizontal rods 107 having their front ends mounted on the support 102 and their inner ends mounted upon a support 108 carried on the bracket 101. Fixed at its upper end to said slide 106 is a vertical rod 109 which projects through a slot 110 provided therefor in the table 91 and which carries upon its lower end an anti-friction roller 111 which travels between the upright side walls of a horizontally disposed channel member 112 that encircles the column 1 and rests upon suitable supports, as the supporting members 113 carried by the truck 5. Said channel member 112 constitutes a guideway whereby said rod 109 is shifted forward and back along said slot 110 at proper intervals in the rotation of the machine for moving said slide 106 to and from blow-mold closing position. As shown in Fig. 15, the contour of said guideway 112 is such that the blow-molds are actuated to close after leaving the fourth station and to open prior to reaching the ninth station.

Located at opposite sides of the blank-mold 23 when the latter occupies charging position, as shown in Figs. 1 and 2, are the blades 114 of shears whereby the glass composing the charge is sheared off prior to the seating of the blow-down 47 upon said mold. Said shears may be of any preferred construction arranged to be automatically actuated at the proper times, an air-cylinder 115 being herein illustrated as operatively associated with said shears. Air is conducted to said cylinder in any suitable manner, as by a pipe 116 leading from the interior of the column 1. A valve 117 carried by said pipe is arranged to be opened and closed automatically at the proper times, said valve being preferably provided with a vertical stem 118 which is adapted to be engaged and depressed to valve-opening position by an arm or stud 119 carried on the periphery of the drum 99. Obviously, said stud engages said stem at each revolution of the drum and must be so located that it operates just prior to movement in which the blank-mold is advanced from the charging station.

The air-cylinder 115 is mounted upon a supporting shelf or bracket 120 which is vertically movable to and from shear-operating position. Said bracket is suspended by a cable 121 which is passed over suitably arranged pulleys, as 122, and carries suspended on its opposite end a counterbalance 123. The weight of said counterbalance is made slightly less than that which would be adequate to support the bracket 120 and the parts mounted thereon in order that the same may normally occupy a position lowered somewhat below operative position. An inwardly extending arm 124 carried by said bracket has mounted thereon a roller 125 which is adapted, as the charging station is approached by each blank-mold, to be engaged by a curved trackway 126 carried by the sections of said mold. As shown in Fig. 17, said trackway 126 is composed of two complemental sections one of which is carried by each of the mold sections. Obviously, said roller 125 is caused to travel upward upon the trackway 126 as the latter is advanced with the closed blank mold to the charging station, resulting in the bracket 120, with the superposed shears and shear-operating mechanism, being elevated to operative position; and, upon the advance of the charged mold from said charging station, said roller gradually descends said trackway permitting the said bracket and superposed parts to return to normal lowered position.

The object had in view in making the shears and their operating mechanism vertically movable, as above described, is to provide for the simultaneous manufacture on a single machine of bottles of various sizes or heights. Since bottles of different heights require blank-molds of different heights, it is obviously necessary that the shears occupy different levels when shearing off the charges deposited in such blank-molds. Each different height of blank mold therefore requires a special trackway 126 designed to effect the required elevation of the shears. In other words, each different height of blank-mold requires that the shears be elevated to operate in approximately the plane of its upper face: and, consequently, the trackways for such molds must be arranged with their uppermost surfaces spaced at uniform distances from the upper faces of the molds irrespective of the heights of the latter. It will here be noted that as many different sizes of bottles may be simultaneously manufactured on the machine as there are blank-molds.

The operation of the machine is substantially as follows: As each blank-mold 23 reaches the charging position, shown at the extreme right in Fig. 2, at which position it remains stationary throughout a suitable interval of time, it is fully closed and occupies seated registering relation to the underlying neck-mold constituted, as aforesaid, by the sectional cup 15, neck-shaping ring 16 and plunger-casing 19, which is also closed. Immediately following the deposit of the charge of molten glass in the blank-mold, the shears 114 are actuated to cut or shear said charge from the charging tool, the opening of the valve 117 being timed to admit to the air-cylinder 115 a shear-actuating charge of air prior to the commencement of the movement in which said molds are advanced to the next station.

It will here be noted that the number of mold-carrying arms may be varied to any extent found desirable, and the arrangement of the intermittent drive is varied to correspond with the number of arms employed on the machine, so that if, for instance, the machine carries ten arms, as in the machine illustrated in the drawings, stops at ten uniformly spaced stations are made during each revolution of the machine.

Promptly following the start of the charged blank-mold from the first, or charging station, the supporting lever 48 for the co-operating blow-down 47 is actuated by engagement of the roller 50 with the inclined end portion of the trackway 51 to swing laterally to dispose said blow-down in vertical alinement with the blank-mold, and is immediately thereafter actuated through travel of said roller to the horizontal portion of said trackway to rock forward, seating said blow-down upon said blank-mold, as shown at the extreme right in Fig. 1 and as shown in full lines in Fig. 8. At the same instant that the blow-down seats as aforesaid, the valve 57 in the air line leading to said blow-down is opened through depressing movement of its stem 61 produced by engagement of the latter with the bar 62. A charge of air is thus admitted to the upper end of said blank-mold whereby the glass charge is compacted downward for shaping the neck of the bottle in the neck-mold. The said bar 62 may be of any appropriate length, preferably such as will serve to maintain the valve 57 open until the second station has been passed. Following the downward compacting of the charge, as aforesaid, the lower end of the plunger 20, which has previously been held elevated for forming the mouth-opening in the blank which is being formed, rides off the end of the underlying track 63 and is immediately actuated by its spring 22 to resume its normal lowered position, whereupon the valve 73 is opened by engagement of its stem 75 with the bar 76, thus admitting to the neck-mold a charge of air which acts within the mouth-opening produced by the plunger 20 upon the glass charge for compacting the latter upward against the blow-down, completing the formation of the bottle blank. Said valve 73 is maintained open throughout any desired interval of time, preferably during the period required for the travel of said blank-mold from the second station to a point between the third and fourth stations, the arc-shaped bar 76 upon which the valve stem rides extending from a point at or adjacent to said second station to a point slightly past the third station.

Promptly following the closing of said valve 73, as aforesaid, the roller 50 carried by the lever 48 passes from its trackway 51, permitting said lever to be rocked back upon its pivotal mounting, actuated by its spring 56, for elevating the blow-down. Simultaneously with said elevating movement, a suitably located spring, as 127, serves to move said lever 48 laterally for carrying the blow-down out of overlying relation to the blank-mold.

At a suitable point, as between the third and fourth stations, the roller 46 carried by the vertical rod 33 passes off the end of the guide 43, and at or adjacent to said fourth station said roller engages the tangential portion of the guide 45 whereby said rod 33 is rapidly forced inward along the slots of the spider arms 8 and 9, effecting through the intermediate mechanism the rapid opening of the blank-mold. Near the end of the blank-mold-opening movement of the rod 33, the lugs 38 of the yoke 37 carried by said rod enter the spirally directed channels 77 in the rotary shaft 12 and, during the travel of said lugs through said channels, actuate said shaft to rotate throughout one-half of a complete revolution, whereby the position of the neck-mold carried by said shaft is reversed. Since said neck-mold then supports therein the formed glass blank, securely holding said blank by its neck, it follows that reversal of said neck-mold as aforesaid also produces reversal of said blank. This reversal is effected at or adjacent to the fifth station. Immediately after said reversal the blow-mold 74 carried by the table 91 below said neck-mold is actuated by outward movement of the rod 109 to close upon the body portion of said blank, following which the stem 75 of valve 73 engages a horizontal bar 129, similar to bar 76, and is thereby depressed to valve-opening position for admitting air to the blow-mold through the neck-mold for blowing the blank into bottle form. Said bar 129 may be of any appropriate length, but preferably terminates at or near the eighth station. Promptly following the closing of the valve 73, which occurs when said valve stem 75 passes off said bar 129, the neck-mold is actuated through inward movement of the short rod 88 along the slot 36 to open, leaving the finished bottle supported in the blow-mold.

At any desired point for which the channel member 112 has been prearranged or constructed, as following movement from the eighth station, the blow-mold is actuated through inward movement of the rod 109 to open for releasing the bottle.

The neck-mold is again actuated to close at a point adjacent to the tenth station by outward movement of the rod 88, and this closing of the neck-mold is promptly followed by reversal of said neck-mold to upright position and the closing of the blank-mold. This reversal of the neck-mold and closing of the blank-mold is rapidly effected through engagement of the roller 46 of rod 33 with a straight portion 43ª of the guide 43 and outward travel of said roller along said portion, which is disposed approximately tangential with respect to the path previously traversed by said rod, said movement of said rod first producing a half revolution of the shaft 12 through the yoke 37, and, second, moving the slide 29 outward so that when the first, or charging, station is reached, the neck and blank molds are properly disposed for receiving a charge of molten glass.

It will be understood that, while we have herein shown and described a practical embodiment of the invention, the same is not confined to a strict conformity with the showing of the drawings or with the structural details described, but may be changed and modified to the extent that such changes and modifications mark no material departure from the salient features of the invention.

What is claimed is—

1. An automatic bottle blowing machine comprising a hollow rotary column, means supplying compressed air to said column means whereby intermittent rotary movement is imparted to said column, a plurality of radially disposed air conducting members carried by said column, a neck-mold carried by each of said members, a blank-mold located over each neck-mold, means for compacting downward into said blank-mold and said neck-mold a charge of glass introduced in the former, means for releasing air from such member for compacting said charge in an upward direction following the downward compacting operation, means for opening said blank-mold following said compacting operations, means for rotating each of said members to reverse the position of said neck-mold and the formed blank carried thereby, a blow-mold closable about the body portion of said reversed blank, and means for releasing air from said member for blowing said blank in said blow-mold to finished bottle form.

2. An automatic bottle blowing machine comprising a hollow air-conducting rotary column, means whereby intermittent rotary movement is imparted to said column, a plurality of radially disposed air-conducting shafts carried by said column, an aircontrol valve on each shaft a neck-mold carried by each of said shafts, a blank-mold located over each neck-mold, means for compacting downward into said blank-mold and said neck-mold a charge of glass introduced in the former, means for opening the valve to permit air from the neck-mold-carrying shaft to be introduced through said neck-mold; for compacting said charge in an upward direction following the downward compacting operation, means for opening said blank-mold following said compacting operations, means for rotating each shaft to reverse the position of said neck-mold and the formed blank carried thereby, a blow-mold closable about the body portion of said reversed blank, and means for opening said valve to admit air from the shaft through said neck-mold for blowing said blank in said blow-mold into bottle form with the neck portion thereof held by said neck-mold.

3. An automatic bottle blowing machine comprising a hollow air-conducting rotary column, means whereby intermittent rotary movement is imparted to said column, a plurality of radially disposed air-conducting members carried by said column, a valve on each of said members a neck-mold carried by each of said members, a blank-mold located over each neck-mold, means for compacting downward into said blank-mold and said neck-mold a charge of glass introduced in the former, means for opening said valve to introduce air through the neck-mold for compacting said charge in an upward direction following the downward compacting operation, means for opening said blank-mold following said compacting operations, means for rotating each of said members to reverse the position of the neck-mold carried thereby and the formed blank carried by the latter, a blow-mold closable about the body portion of said reversed blank, means for opening said valve to introduce air through said neck-mold for blowing said blank into bottle form in said blow-mold with the neck portion thereof held by said neck-mold, and means for actuating said neck-mold to return to upright position following the blowing operation.

4. An automatic bottle blowing machine comprising a hollow air-conducting rotary support, means whereby intermittent rotary movement is imparted to said support, a plurality of radially disposed air-conducting members carried by said support, a valve on each of said members a neck-mold carried by each of said members, a plunger vertically movable into and out of the neck-forming portion of said neck-mold, a blank-mold carried by said support over each of said neck-molds, means for compacting in a downward direction a glass charge introduced in said blank-mold, means for opening said valve to introduce air through said neck-mold for compacting said charge in an upward direction following the downward compacting operation, means actuating said blank-mold to release the blank formed by the compacting operations, a blow-mold carried by said support below each neck-mold, means for rotating said neck-mold to reversed position for positioning said blank with respect to said blow-mold, means actuating said blow-mold to close about the body of said blank, and means for opening said valve to introduce air through said neck-mold for blowing said blank into bottle form.

5. An automatic bottle blowing machine comprising a hollow air-conducting rotary support, means whereby intermittent rotary movement is imparted to said support, a plurality of radially disposed air-conducting members carried by said support, valves carried by said members a neck-mold carried by each of said members, a plunger operable through the bottom of said neck-mold, means for elevating said plunger, a blank-mold carried by said support over each neck-mold, means for directing air into said blank-mold for compacting in said blank and neck molds about the upper end of the elevated plunger a charge of glass introduced in said blank-mold, means for opening said valve to direct a blank-forming charge of air upward through said neck-mold when said plunger is lowered, means for opening and closing said blank-mold at predetermined points in the rotary travel, a blow-mold carried by said support below each neck-mold, means for opening and closing said blow-mold at predetermined intervals, means for rotating said neck-mold to reversed position for positioning the blank with respect to the open blow-mold, and means for opening said valve to admit air through said neck-mold for blowing said blank into bottle form within said blow-mold.

6. An automatic bottle blowing machine comprising a hollow air-conducting rotary support, means whereby intermittent rotary movement is imparted to said support, a plurality of radially disposed air-conducting members carried by said support, said members being in open communication with said support, a valve on each member, a neck-mold carried by each of said members, a plunger operable through the bottom of said neck-mold, means for elevating said plunger, a blank-mold carried by said support over each neck-mold, means for directing air into said blank-mold for compacting in said blank and neck molds about the upper end of the elevated plunger a charge of glass introduced in said blank-mold, means for opening said valve to direct a blank-forming charge of air upward through said neck-mold when said plunger is lowered, means for opening and closing said blank-mold at predetermined points in the rotary travel, a blow-mold carried by said support below each neck-mold, means for opening and closing said blow-mold at predetermined intervals, means for rotating said neck-mold to reversed position for positioning the blank with respect to the open blow-mold, and means for opening said valve to direct air through said neck-mold when the body of said blank is held within said blow-mold whereby said blank is blown into bottle form.

7. An automatic bottle blowing machine comprising a hollow air-conducting rotary support, means whereby intermittent rotary movement is imparted to said support, a plurality of radially disposed air-conducting members carried by said support, said members being in open communication with said support, a valve on each member, a neck-mold carried by each of said members, a plunger operable through the bottom of said neck-mold, means for elevating said plunger, a blank-mold carried by said support over each neck-mold, means for directing air into said blank-mold for compacting in said blank and neck molds about the upper end of the elevated plunger a charge of glass introduced in said blank-mold, means for opening said valve to direct a blank-forming charge of air upward through said neck-mold when said plunger is lowered, means for opening and closing said blank-mold at predetermined points in its rotary travel, a blow-mold carried by said support below each neck-mold, means for opening and closing said blow-mold at predetermined intervals, means for rotating said neck-mold to and from reversed position at predetermined intervals, said neck-mold when in reversed position supporting the blank in position to be received by the blow-mold, means for opening said valve to admit air through said member for blowing said blank into bottle form in said blow-mold, and means for opening and closing said neck-mold at predetermined intervals.

8. An automatic bottle blowing machine comprising a hollow air-conducting rotary support, means whereby intermittent rotary movement is imparted to said support, a plurality of radially disposed air-conducting members carried by said support, a valve carried by each member, a neck-mold carried by each of said members, a plunger operable through the bottom of said neck-mold, means for elevating said plunger, a blank-mold carried by said support over each neck-mold, means for directing air into said blank-mold for compacting in said blank and neck molds about the upper end of the elevated plunger a charge of glass introduced in said blank-mold, means for opening said valve to direct a blank-forming charge of air from said member upward through said neck-mold when said plunger is lowered, means for opening and closing said blank-mold at predetermined points in its rotary travel, a blow-mold carried by said support below each neck-mold, means for opening and closing said blow-mold at predetermined intervals, means for rotating said neck-mold to and from reversed position at predetermined intervals, said neck-mold being adapted when reversed to deposit the body of the blank in position to be received by the blow-mold when the latter is closed, and means for opening said valve to direct air from said member through said neck-mold for blowing said blank into bottle form in said blow-mold.

9. An automatic bottle blowing machine comprising a hollow air-conducting rotary column, means whereby intermittent rotary movement is imparted to said column, a plurality of radially-disposed air-conducting shafts carried by said column, a valve on each shaft a neck-mold carried by each of said shafts, means for opening and closing said neck-mold at predetermined points in the travel thereof, a plunger operable through the lower end of said neck-mold, means whereby said plunger is held elevated within said neck-mold when the latter occupies charging position, a blank-mold associated with each neck-mold, means whereby said blank-mold is actuated at predetermined intervals to open and close, said blank-mold when closed being superposed upon said neck-mold, means for compacting within said blank and neck-molds and about the upper end of said plunger a charge of glass introduced in said blank-mold, means effecting withdrawal of said plunger, means for opening said valve to direct from said shaft a blank-forming charge of air in the mouth-opening produced in the charge by said withdrawn plunger, a blow-mold associated with each neck-mold, means for opening and closing said blow-mold at predetermined intervals, means operable following opening of the blank-mold and preceding closing of the blow-mold for reversing the neck-mold, said blow-mold being located in such relation to the reversed neck-mold that it closes upon the body portion of the reversed blank carried by the latter, and means for opening said valve to direct air through said shaft for blowing said blank into bottle form in said neck and blow-molds.

10. An automatic bottle blowing machine comprising an air-conducting rotary column, means whereby intermittent rotary movement is imparted to said column, a plurality of radially-disposed air-conducting shafts carried by said column, a valve on each shaft a neck-mold carried by each of said shafts, means for opening and closing said neck-mold at predetermined points in the travel thereof, a plunger operable through the lower end of said neck-mold, means whereby said plunger is held elevated within said neck-mold when the latter occupies charging position, a blank-mold associated with each neck-mold, means whereby said blank-mold is actuated at predetermined intervals to open and close, said blank-mold when closed being superposed upon said neck-mold, means for compacting within said blank and neck-molds and about the upper end of said plunger a charge of glass introduced in said blank-mold, means effecting withdrawal of said plunger, means for opening said valve to direct through said shaft a blank-forming charge of air in the mouth-opening produced in the charge by said withdrawn plunger, a blow-mold associated with each neck-mold, means for opening and closing said blow-mold at predetermined intervals, means operable following opening of the blank-mold and preceding closing of the blow-mold for reversing the neck-mold, said blow-mold being located in such relation to the reversed neck-mold that it closes upon the body portion of the reversed blank carried by the latter, and means for opening said valve to direct through said shaft and said neck-mold air for blowing said blank into bottle form.

11. An automatic bottle blowing machine comprising an air-conducting rotary column, means whereby intermittent rotary movement is imparted to said column, a plurality of radially-disposed air-conducting shafts carried by said column, a valve on each shaft a neck-mold carried by each of said shafts, means for opening and closing said neck-mold at predetermined points in the travel thereof, a plunger operable through the lower end of said neck-mold, means whereby said plunger is held elevated within said neck-mold when the latter occupies charging position, a blank-mold associated with each neck-mold, means whereby said blank-mold is actuated at predetermined intervals to open and close, said blank-mold when closed being superposed upon said neck-mold, a blow-down associated with each blank-mold, means whereby said blow-down is actuated to move into seated relation to said blank-mold following charging of the latter with molten glass, means for directing air through said blow-down for compacting the charge within said blank and neck molds and about the upper end of said plunger, means effecting withdrawal of said plunger following said compacting operation, means for opening said valve to direct through said shaft and said neck-mold a blank-forming charge of air in the mouth-opening produced in said charge by said withdrawn plunger, a blow-mold associated with each neck mold, means for opening and closing said blow-mold at predetermined intervals, means operable following opening of the blank-mold and preceding closing of the blow-mold whereby said neck-mold is reversed, said blow-mold being located in such relation to the reversed neck-mold that it closes upon the body portion of the blank carried by the latter, and means for opening said valve to direct air through said shaft and said neck-mold for blowing said blank into bottle form in said neck and blow-molds.

12. In an automatic bottle blowing machine, a hollow air-conducting rotary support carrying blank-molds and blow-molds, radial air-conducting shafts carried by said support, neck-molds carried by each of said shafts, mechanisms whereby said blank-molds and blow-molds are opened and closed at predetermined intervals, each of said neck-molds being adapted in one position to cooperate with an adjacent blank-mold in the formation of a bottle blank and in another position to cooperate with an adjacent blow-mold in the blowing of said blank into bottle form, means whereby said neck-mold is actuated to move from one position to the other and to return at predetermined intervals, a valve carried by each shaft, and means for opening said valve at two points in the rotation of the shaft by which it is carried.

13. In an automatic bottle-blowing machine, the combination with a rotary support carrying blank-molds and blow-molds and mechanisms whereby said molds are opened and closed at predetermined intervals, of means whereby intermittent rotary movement is imparted to said support, a plurality of rotary shafts carried by said support and having channels therein, a neck-mold carried by each shaft adapted in one position to cooperate with an adjacent blank-mold for forming a bottle blank, and in a reversed position to cooperate with an adjacent blow-mold for blowing said blank into bottle form, means operable in the channels of each shaft whereby the latter is intermittently rotated throughout one-half revolution for positioning said neck-mold with respect to said blank and blow-molds at predetermined intervals, each of said shafts being hollow and communicating at one end with a source of air supply and at the other with the interior of the neck-mold carried thereby, and a valve on each shaft arranged to be opened at predetermined intervals for admitting air for forming a blank in the blank-mold and for admitting air for blowing said blank into bottle form in the blow-mold.

14. In an automatic bottle-blowing machine, the combination with a rotary member carrying a plurality of blank-molds and mechanisms whereby said molds are opened and closed at predetermined intervals, of means whereby intermittent rotary movement is imparted to said member, shears located adjacent to the path of travel of said molds and adapted for actuation to shear off charges of glass introduced in said molds, a vertically movable support for said shears, said support normally supporting said shears below their operative level, and cooperating means carried by said support and by each of said molds whereby said support is elevated for disposing said shears in operative position as each mold approaches charging position.

15. In an automatic bottle-blowing machine, the combination with a rotary member carrying a plurality of blank-molds and mechanisms whereby said molds are opened and closed at predetermined intervals, of means whereby intermittent rotary movement is imparted to said member, shears located adjacent to the path of travel of said molds and adapted for actuation to shear off charges of glass introduced in said molds, a vertically movable support for said shears, said support being normally stationed in a position supporting said shears below their operative level, a trackway carried by each of said molds, and means adapted to mount said track whereby said support is elevated for disposing said shears in operative position as said molds severally approach charging position, said trackways being spaced at uniform distances from the tops of said molds irrespective of the heights of the latter.

16. In an automatic bottle-blowing machine, the combination with a rotary member carrying a plurality of blank-molds and mechanisms whereby said molds are opened and closed at predetermined intervals, of means whereby intermittent rotary movement is imparted to said member, vertically movable shears located adjacent to the path of travel of said molds and adapted for actuation to shear off charges of glass introduced in said molds, said shears being normally stationed in lowered inoperative position with respect to said molds, and means carried by each mold whereby, when the latter approaches charging position, said shears are elevated into operative relation to the mold.

17. In an automatic bottle-blowing machine, the combination with a rotary support carrying a plurality of blank molds and blow-molds and mechanisms whereby said molds are opened and closed at predetermined intervals, of means whereby intermittent rotary movement is imparted to said support, a neck-mold located adjacent to each of said blank-molds, said neck-molds being reversible and each thereof being adapted in one position to cooperate with the adjacent blank-mold for forming a glass blank and in another position to cooperate with an adjacent blow-mold for blowing said blank into bottle form, and means for effecting reversal of said neck-mold at predetermined intervals, said reversing means including an air conducting shaft upon which said neck-mold is mounted, bearings for said shaft, said shaft having opposite spiral channels therein, a member having lugs disposed for movement along said channels, means whereby said member is shifted at predetermined intervals, and means controlling the passage of charges of air through said shaft.

In testimony whereof we affix our signatures in presence of two witnesses.

WILLIAM HENRY.
ISAAC BASSFORD.

Witnesses:
G. O. SMITH,
H. E. DUNLAP.